United States Patent [19]

Yamaguchi et al.

[11] 4,152,568
[45] May 1, 1979

[54] METHOD OF ARC WELDING WITH REVERSE SIDE COOLING FOR OBTAINING HIGHLY TOUGH LARGE-DIAMETER WELDED STEEL PIPES

[75] Inventors: Tetsuo Yamaguchi; Tadaaki Taira; Kiyoteru Hirabayashi; Yukio Nishino, all of Fukuyama, Japan

[73] Assignee: Nippon Kokan Kabushiki Kaisha, Tokyo, Japan

[21] Appl. No.: 896,018

[22] Filed: Apr. 12, 1978

Related U.S. Application Data

[63] Continuation of Ser. No. 712,327, Aug. 6, 1976, abandoned.

[30] Foreign Application Priority Data

Aug. 8, 1975 [JP] Japan .................................. 50-95755

[51] Int. Cl.² ........................................... B23K 31/06
[52] U.S. Cl. .................................. 219/61.7; 219/59.1; 228/222
[58] Field of Search ................. 219/59.1, 61.7, 137 R; 228/222

[56] References Cited

U.S. PATENT DOCUMENTS 2,716,691  8/1955  Bowman ................................ 219/61

FOREIGN PATENT DOCUMENTS 997934  7/1965  United Kingdom ................ 219/137 R Primary Examiner—E. A. Goldberg
Attorney, Agent, or Firm—Haseltine, Lake & Waters

[57] ABSTRACT

An arc welding method for manufacture of a welded steel pipe wherein the edges of a steel plate bent into a pipe shape are welded together on one side for forming a pipe and then the seam line of the thus formed pipe is welded by a second welding operation at the side opposite to the side where the first welding was performed. During such second welding, the weld is cooled forcedly from the side where the first welding was performed. Such forced cooling compensates for any physical effects accompanying the welding and imparts elevated toughness to both the weld metal and the heat affected zone.

6 Claims, 43 Drawing Figures (a) Cooling time (sec.) for cooling from max. temp. to 800°C.

(b) Cooling time (sec.) for cooling from 800°C to 500°C.

(a)

(b)

(a) (b)

(a) (b)

(a) (b)

METHOD OF ARC WELDING WITH REVERSE SIDE COOLING FOR OBTAINING HIGHLY TOUGH LARGE-DIAMETER WELDED STEEL PIPES

CROSS-RELATED APPLICATION

This application is a continuation of Ser. No. 712,327 filed Aug. 6, 1976 now abandoned.

BACKGROUND OF THE INVENTION

This invention relates to a method of welding seam portions of a pipe fashioned from a steel plate.

When welding along a seam line of a pipe fashioned from a steel plate, the heat affected zone (hereinafter abbreviated occasionally to HAZ) will become brittle due to marked formation, in the course of the welding heat cycle, of an upper bainite in the vicinity of a bond or transition zone between the weld metal and parent metal.

Such brittleness of the heat affected zone is undesirable especially when a low temperature toughness in excess of a predetermined value is a requirement. It is believed that high toughness of the weld metal may not be realized due to formation of the proeutectoid ferrite. An accepted practice is to cool the heat affected zone during welding. In the case of submerged arc welding, hereinafter abbreviated occasionally as SAW, the cooling of the weld or weld joint may be caused by spontaneous cooling of the weld zone surrounded by the fluxes, dissipation of heat from the lower surface of the parent metal and the transfer of heat to the parent metal. Reliance on such spontaneous cooling solely gives rise to retarded cooling of the weld surrounded by a thick layer of slags, thus the Charpy strength of the weld being lowered. Such tendency will be more noteworthy when the heat input is elevated. For this reason, a variety of cooling methods have been proposed for cooling the weld, including water cooling used in conjunction with vertical electro-slag welding. This method is however not applied to the case of submerged arc welding. It is also known to cool the weld surface with a mist after welding and subsequent to the flux removal. With such cooling, the start time of cooling may be delayed due to hygrospic properties of the fluxes and the mounting of the flux recovery device between the cooling position and the electrodes. Moreover, such cooling technique can not be used for cooling the inside weld of a large diameter pipe which has been welded on the outside by the preceding welding operation.

In submerged arc welding, endeavors have been made to improve the toughness of the heat affected zone as by using fluxes of higher basicity or adding to the weld metals alloying agents such as nickel, molybdenum and titanium. It was also proposed to perform a so-called multi-layer welding at the sacrifice of welding efficiency or to add the parent metal with trace amounts of Ti, Al-B, REM-B Ti-Ca or similar combinations of alloying agents. Especially, higher notch toughness is required of the weld metal and the heat affected zone of large diameter pipes that are designed for the frigid zone such as Arctic Zone where the temperatures may fall to $-25°$ to $-40°$ C. It is a matter of great difficulty to satisfy the above requirement by using the currently marketed steel plates and welding wires at an acceptable cost.

SUMMARY OF THE INVENTION

A main object of the present invention is to manufacture a thick-walled welded steel pipe of higher toughness by using the currently marketed steel plates and welding materials intended for pipe lines.

Another object of the present invention is to provide a method of welding of steel pipes whereby the deterioration in the low temperature toughness of the heat affected zone due to high heat input to the thick-walled welded steel pipes may be prevented.

A further object of the present invention is to provide a method for welding of steel pipes whereby the welded zone of a steel pipe manufactured from controlled rolled steel plates may be prevented from undergoing excess hardening.

A further object of the present invention is to provide such welding method wherein the necessity for controlling the chemical composition and other conditions of the parent and welding metals may be eliminated.

According to the welding method of the present invention, the starting plate is bent into the shape of a pipe, and the longitudinal seam line of the pipe is welded on the inner surface of the tube. Then, the arc or submerged arc welding is performed on the outer surface along the same seam line. During this second welding, the inside weld is subjected to forced cooling. Thus, the forced cooling is carried out from the side opposite to the arc used for the formation of the outside weld. Such forced cooling has been ascertained to improve the hardenability of the weld metal through suppression of the formation of the proeutectoid ferrite and concurrently the toughness of the weld through suppression of the formation of the upper bainite in the heat affected zone. When the seam line of the thick-walled steel pipe is formed by several welding passes, the inventive arc welding accompanied by forced cooling from the reverse side may be applied to the final welding pass.

The toughness of both the welding metal and the heat affected zone will become more pronounced by using higher cooling rates for the forced cooling through the ranges from the maximum temperature to 800° C. and from 800° to 500° C. The cooling rate of 8° to 40° C. and preferably of 15° to 30° C. per second for the cooling range from 800° to 500° C. is most preferred in order to obtain high toughness for the welding metal and the heat affected zone. As cooling agent, water, liquid nitrogen or dry ice may be employed within the scope of the present invention. In water cooling, the more the flow of cooling water, the sooner the cooling. With forced circulation cooling by three nozzles with the total flow rate of 45 liters per minute, the cooling of the welded article from 800° to 500° C. may be carried out at a speed three to four times faster than the case wherein no forced circulation cooling is employed. With use of liquid nitrogen or dry ice, the cooling from the maximum temperature to 800° C. proceeds usually at a higher speed because of the precooling effects of these cooling agents. However, the cooling rate from 800° to 500° C. will be lower than that attained by water because the heat exchange capacity of these cooling agents is lower than that of water.

The increased toughness of the welding metal to be attained by the reverse side cooling may be attributable to the retarded precipitation of coarse ferrites from the γ grain boundary with resulting refining of the ferrite ground, and to the increase in the precipitation of the lower bainite. In case of using a starting plate manufactured by controlled rolling, the weld metal of the inside weld may be increased in toughness because of the apparent disappearance of the precipitation hardening brittleness by virtue of the second welding at the outside accompanied by cooling from the inside. With use of the compensating welding wires, the toughness of the weld metal at the inner surface of the pipe may become lower than that measured at the intermediate zone or near the outer surface of the pipe. However, such decrease in toughness at the inner surface may be hindered by increasing the rate of cooling. These changes in toughness in the direction of the pipe wall thickness may be compensated through suitable selection of the welding wires used for the respective welding passes.

The increased toughness of the heat affected zone may be attained by promoting the cooling for the range from the maximum temperature to 800° C. in such a manner that the cooling through said range may be completed within preferably 11 seconds. In this case, the width of the coarse grain zone may be reduced and there is no formation of the coarsely grained preaustenitic crystals. Furthermore, if the cooling rate for the temperature range from 800° to 500° C. is increased to 8° C./sec or more through the reverse side cooling, a higher toughness of HAZ may be realized through suppression of the upper bainite and promotion of the lower bainite. On the other hand, the weld metal and the heat affected zone will become harder for a faster cooling rate. For example, at the cooling rate where the highest toughness may be attained, the hardness will reach a value almost close to saturation. From such consideration, the optimum cooling rate for the temperature range of 800° to 500° C. is 15° C. per second or thereabouts. According to the present invention, however, the upper limit of the cooling for the temperature range of 800° to 500° C. is selected to be 40° C. per second where the toughness starts to be lowered under the so-called quenching effect.

Further objects and advantages of the present invention will become more apparent from the following detailed description of the preferred embodiment and the accompanying drawings.

DESCRIPTION OF THE PREFERRED EMBODIMENT

Figure 1:
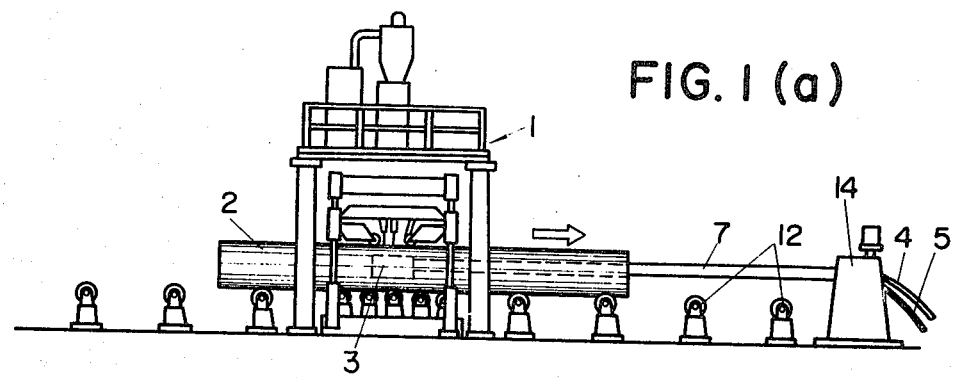
FIGS. 1(a) and 1(b) show a typical device designed for executing the inventive method, in side elevation and partial enlarged view, respectively.
Figure 1:
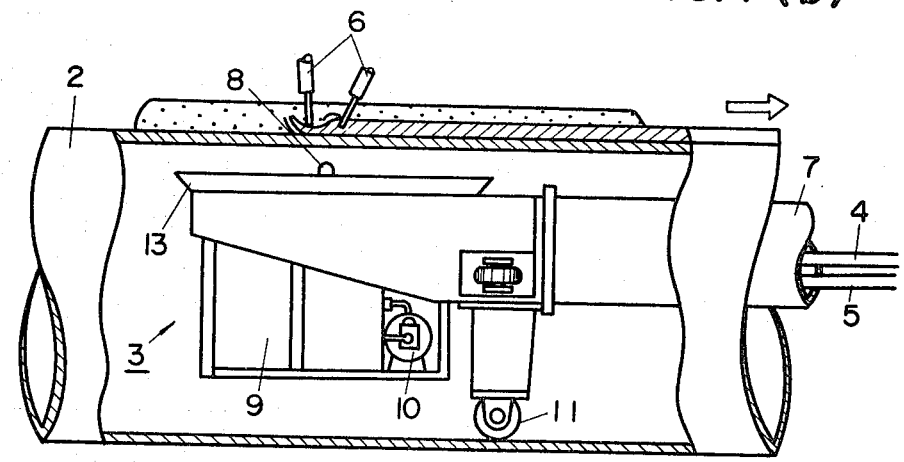

In FIG. 1(a), a steel pipe 2 conveyed axially on transport rollers 12 has been welded previously along a longitudinal seam line from the inside and is to be welded in a welding machine 1 on the transport rollers 12 along the same longitudinal seam line but now from the outside. As the pipe 2 is being welded from the outside, it is cooled simultaneously by a cooling device 3 from the reverse side which is, in the embodiment illustrated, the inner side of the steel pipe 2.

The cooling device 3 is shown in the enlarged view of FIG. 1(b) and comprised of a boom 7 extending lengthwise of the transport line and fitted at the end with a cooling water tank 9 and a pump 10. The end of the boom 7 is also provided with a support roller 11 adapted to travel along the inner surface of the steel pipe, and a cooling water nozzle 8 directed towards the weld along the seam line. Cooling water may be supplied to nozzle 8 from a water pipe 5 connected to the external water source and by way of the tank 9 and the pump 10. The cooling water may be sprayed by the nozzle 8 towards the inside weld metal at a predetermined flow rate by the controlled operation of the pump 10. The water pipe 5 and a power cable 4 such as wire for driving the pump 10 are passed through the boom 7 and extended to an external device including a water source and an electrical source, not shown. In FIG. 1(b), the numeral 6 denotes a leading electrode or wire and a trailing electrode or wire of the welding machine 1 mounted in a confronting relation with the cooling nozzle 8. The numeral 13 denotes a water pan for receiving the used water which flows down and is returned to the tank 9. The boom 7 may be displaced lengthwise by a support device 14 for changing the position of the nozzle relative to the pipe 2.

The steel pipe 2, which has been welded along a longitudinal seam line on the inside may thus be welded on the outside along the same seam line as it is fed in the direction of the arrow marks in FIGS. 1(a) and 1(b) along the transport rollers 12. Simultaneously with outside cooling, the cooling water is sprayed from the nozzle 8 to the inside weld directly opposite to the welding electrodes.

In FIGS. 1(a) and 1(b), only one nozzle 8 is used for spraying cooling water to the reverse side of the outside weld. However, two or more nozzles may be provided in tandem along the seam line, and the cooling water may also be circulated forcibly for increasing the heat exchange capacity. Alternatively, cooling water may be replaced by liquid nitrogen, or a dry ice may be mounted in direct physical contact with the inside of the pipe for cooling.

Reference is now made to FIGS. 2(a) to 2(f) showing these various cooling modes that may be used with the submerged arc welding.

Figure 2A:
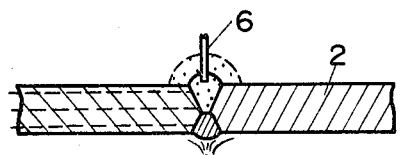
FIGS. 2(a) to 2(f) show various examples of the reverse side cooling according to the present invention.

FIG. 2(a) shows a single nozzle 8 being used for reverse side cooling as already explained with reference to FIGS. 1(a) and 1(b). In FIG. 2(a), the upper view shows the weld in the transverse section and the lower view shows the weld in the longitudinal section. In FIG. 2(a), the three dotted lines indicate drill holes bored from the end face of the test steel piece to the bead for insertion of thermocouples used for measuring the temperature as will be described.

Figure 2B:
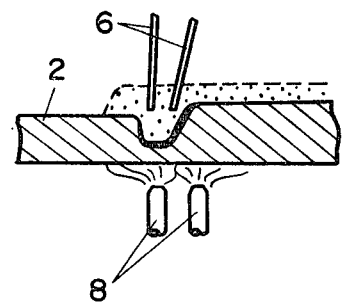
Figure 2B:
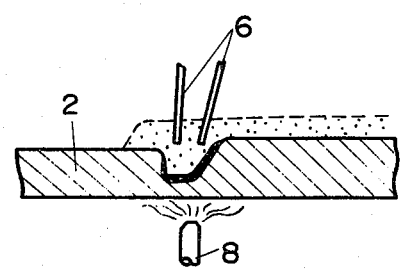

In FIG. 2(b), two nozzles 8 are placed in tandem along the seam line. By using the nozzles of the same size, the flow rate of the cooling water may be doubled with consequent increases in the rate of cooling. For example, if the flow rate is 12 liters per minute for a single nozzle, the flow rate will increase to 24 liters per minute with two nozzles shown in FIG. 2(b). In FIG. 2(c), three nozzles 8 are placed in tandem on the seam line for obtaining the flow rate of 36 liters per minute with a still faster rate of cooling.

Figure 2D:
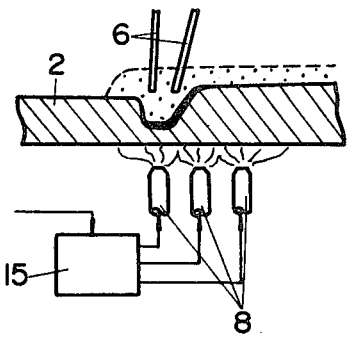
Figure 2C:
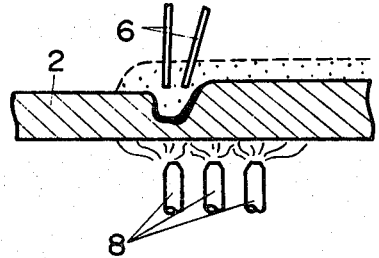

In FIG. 2(d), a compulsory, circulating unit 15 such as tank and pump 10 shown in FIG. 1(b) is used for directing the cooling water under pressure to the three nozzles 8 for realizing a faster cooling rate by increasing the flow rate to, for instance, 45 liters per minute.

Figure 2E:
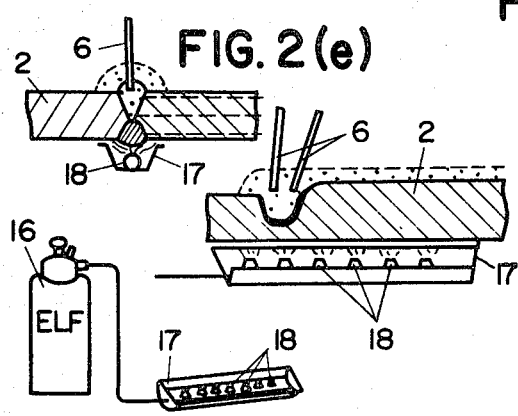

In FIG. 2(e), there is shown a liquid nitrogen source, such as vessel 16, from which the liquid nitrogen is delivered to plural nozzles 18 mounted within a hood 17. The liquid nitrogen may be sprayed from the nozzles 18 to the reverse side of the outside weld metal at a rate of, for instance, 400 kg per hour.

Figure 2F:
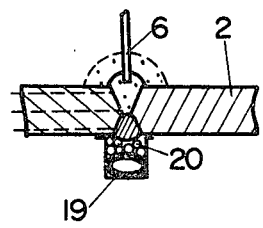

In FIG. 2(f), an air hose 19 is dilated for applying a piece of dry ice 20 to the reverse side of the outer weld metal for cooling the weld.

In FIGS. 2(e) and 2(f), the three dotted lines indicate the mounting positions for thermocouples as in the case of FIG. 2(a).

These various cooling modes for reverse side cooling may be selectively employed for cooling the weld of a steel pipe which has been welded on the inside and is being welded on the outside. With such cooling, the formation of the proeutectoid or of the upper bainite at the HAZ may be prevented with consequent increase in the toughness of the weld.

A series of tests on arc welding associated with reverse side cooling were conducted with test steel plates A, B, C and D, for checking the effects of various cooling rates on the toughness, hardness and microstructure of the welding metal and the HAZ.

Four test steel pieces A, B, C and D with varying thicknesses, grades and chemical compositions as shown in the following Table 1 were employed. The test plate D was 10.3 mm thickness, the test plates C and B were prepared by controlled rolling and 20.3 and 18.3 mm thickness, respectively, while the test plate A was made of 1.4 Ni steel with thickness of 25.4 mm.

Table 1

| Type | Gr | W.T. (mm) | C | Si | Mn | P | S | Cu | ni | Mo | Nb | V | Sol Al |
|---|---|---|---|---|---|---|---|---|---|---|---|---|---|
| A | ×65 | 25.4 | .092 | .25 | 1.17 | .014 | .007 | — | 1.41 | .17 | — | — | .053 |
| B | ×70 | 20.3 | .080 | .31 | 1.45 | .012 | .004 | — | .26 | .15 | .037 | .092 | .045 |
| C | ×70 | 18.3 | .086 | .23 | 1.43 | .014 | .005 | .19 | .21 | — | .039 | .091 | .020 |
| D | ×52 | 10.3 | .126 | .15 | .65 | .015 | .009 | — | — | — | — | — | .017 |

Chemical Composition of Test Steel pieces (Ladle) (%)

Test welding wires a, b used for the tests are shown in the following Table 2. Test wire a was a Ni - Mo - Ti alloy and the test wire b was free of any alloying agents.

Table 2

| | Chemical Composition of Test Wires (%) | | | | | | | | |
|---|---|---|---|---|---|---|---|---|---|
| | dia (mm) | C | Si | Mn | P | S | Ni | Mo | Ti |
| a | 4.0 | .03 | .17 | 2.03 | .011 | .007 | .91 | .52 | .21 |
| b | 4.0 | .07 | .01 | .68 | .009 | .012 | — | — | — |

Test fluxes X, Y used for the tests are shown in the following Table 3. The test flux X was weakly basic with basicity equal to 1.2 and the test flux Y was strongly basic with basicity equal to 1.6.

Table 3

| | Chemical Composition of Test Fluxes (%) | | | | | | | | | |
|---|---|---|---|---|---|---|---|---|---|---|
| | $CiO_2$ | CaO | MnO | MgO | $Al_2O_3$ | $CaF_2$ | $CrO_2$ | P | S | FeO |
| X | 32 | 20 | 11 | 8 | 11 | 13 | 23 | .011 | .163 | .98 |
| Y | 28 | 28 | — | 19 | 18 | 22 | — | .022 | .222 | .22 |

The welding wires and fluxes and other welding conditions are shown in the following Table 4 for the respective test pieces A to D.

Table 4

| | | Welding Condition | | | | | | | |
|---|---|---|---|---|---|---|---|---|---|
| | | Leading | | Trailing | | Electrode | Speed | Heat Input | | |
| Steel | | A | V | A | V | Space | mm/min | J/cm | wire | Flux |
| | Inside | 700 | 36 | 640 | 40 | 14 mm | 1,250 | 24,400 | a+a | X |
| D | Outside | 940 | 38 | 620 | 40 | 15 | 1,00 | 36,300 | a+a | Y |
| | Inside | 920 | 36 | 700 | 40 | 14 | 850 | 43,100 | b+a | Y |
| C | Outside | 960 | 38 | 700 | 40 | 15 | 800 | 48,400 | a+a | Y |
| | Inside | 940 | 36 | 700 | 40 | 14 | 850 | 43,700 | b+a | Y |
| B | Outside | 960 | 38 | 700 | 40 | 15 | 800 | 48,400 | a+a | Y |
| | Inside | 1,000 | 38 | 800 | 40 | 14 | 700 | 60,000 | a+a | Y |
| A | Outside | 1,050 | 38 | 900 | 40 | 15 | 700 | 65,100 | a+a | Y |

The scarf angle for the inside and welds are 45° for the respective test pieces A to D. The depth of scarf was selected to one-third of thickness for each of the inside and outside welds for the respective test pieces A to D.

Figure 3:
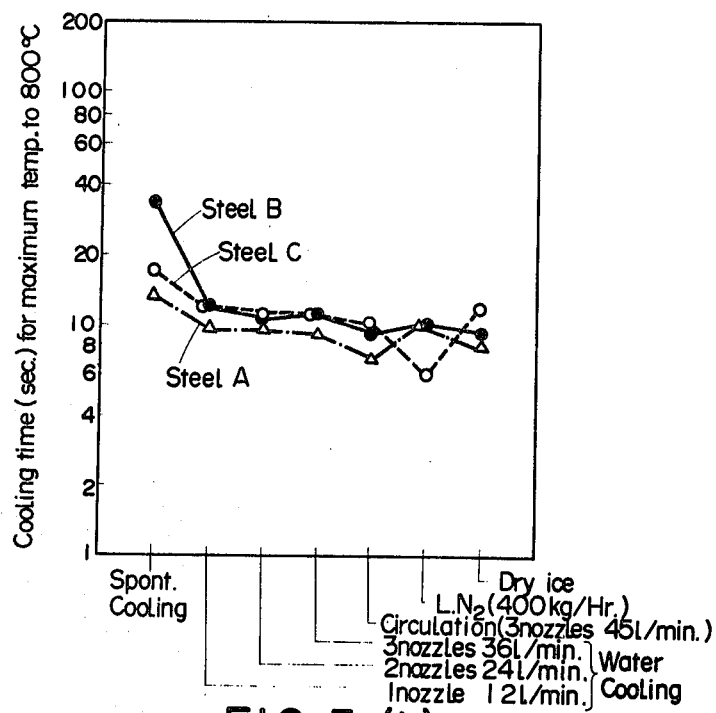
FIGS. 3(a) is a diagram showing the cooling time required for the three test pipes to cool from the maximum temperature to 800° C. for the spontaneous cooling and the various inventive reverse side cooling modes.
FIG. 3(b) is a similar diagram for the temperature range from 800° to 500° C.
Figure 3:
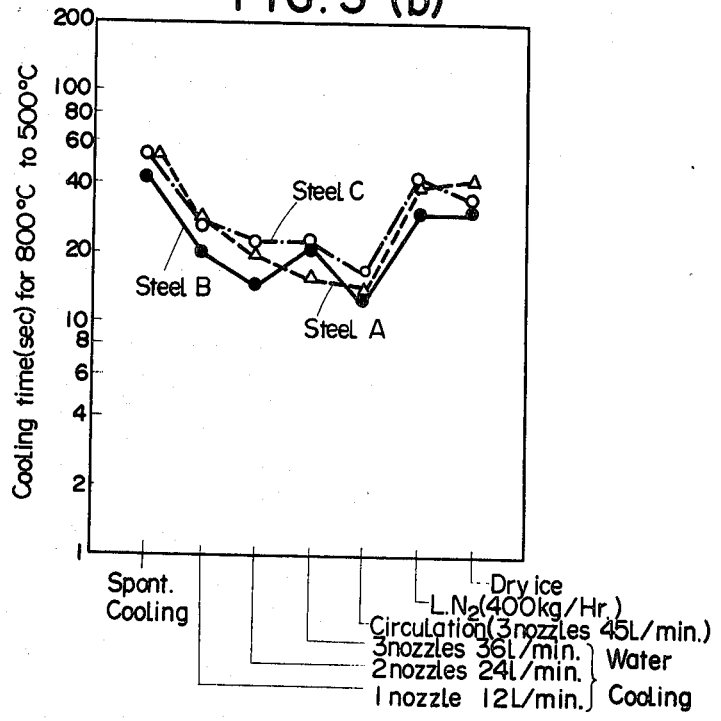

In FIGS. 3(a) and 3(b), the cooling time intervals necessary for cooling from the maximum temperature to 800° C. and from 800° C. to 500° C. are shown for the cases of conventional welding with natural cooling and the welding associated with the various cooling modes. It is seen from FIG. 3(a) that the cooling time necessary for cooling from the maximum temperature to 800° C. may be progressively reduced with use of one and two nozzles as compared with spontaneous cooling. With three nozzles, the cooling time remains almost equal to that obtained with two nozzles, and a somewhat shorter cooling time may be attained by use of compulsory circulation of the cooling water. It is also seen from FIG. 3(b) that the cooling time interval necessary for cooling through the range of 800° C. to 500° C. may be reduced progressively with increase in the number of the nozzles and hence in the flow rate and that use of forced circulation of cooling water results in a cooling rate several times faster than in the case of spontaneous cooling.

It is also seen from FIGS. 3(a) and 3(b) that the use of liquid nitrogen or dry ice gives almost the same cooling rate as that attained with forced circulation with three nozzles (flow rate, 45 liters/min.) for the temperature range from 800° C. to 500° C. These high cooling effects, proper to liquid nitrogen and dry ice, may be attributed to the precooling of the weld by the liquid nitrogen prior to spraying from the nozzles or by the dry ice prior to the arc generation from the welding torch. With liquid nitrogen and dry ice, the cooling time necessary for cooling from 800° C. to 500° C. will become much longer than in the case of water cooling because of the lower heat exchange capacity of the liquid nitrogen or dry ice than that of water.

Figure 4:
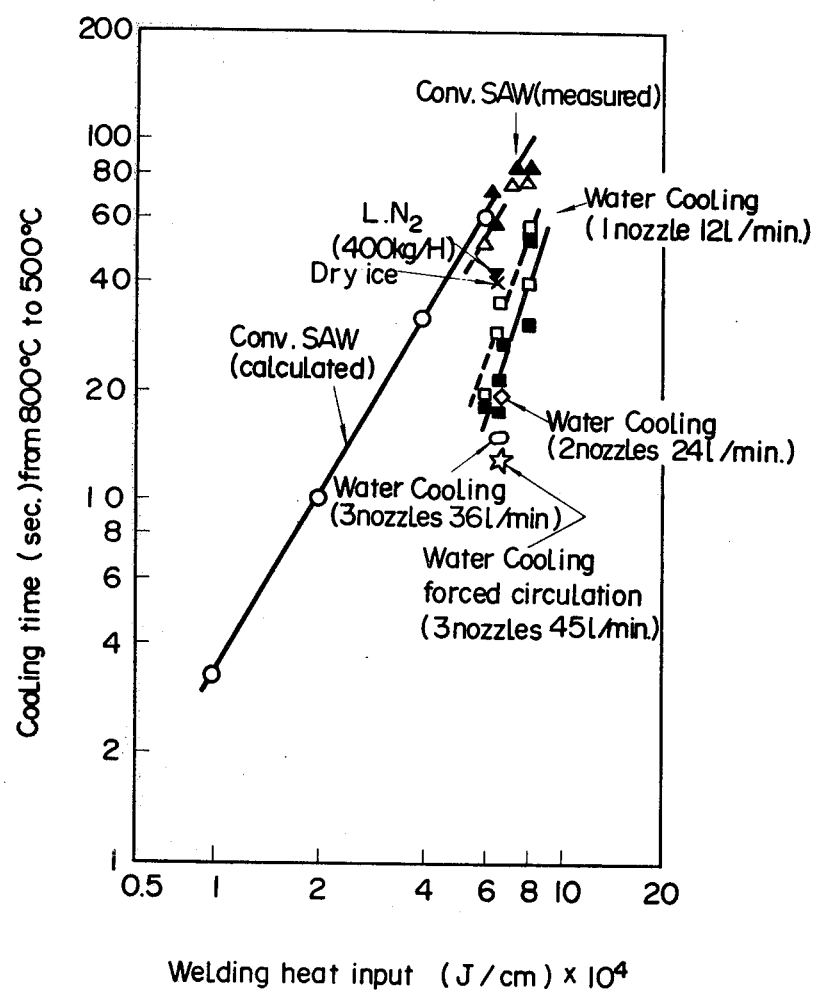
FIG. 4 is a diagram showing the welding heat input versus cooling time for the spontaneous cooling and the various inventive reverse side cooling methods.

In FIG. 4, the cooling time necessary for cooling from 800° C. to 500° C. is shown for varying heat inputs for the steel piece A for conventional welding and the inventive welding with the various cooling modes. The straight solid line in FIG. 4 represents the calculated value for the conventional SAW with natural cooling. The measured values for the cases of conventional welding and the inventive cooling with water cooling with one nozzle are shown in FIG. 4 in the vicinity of 65,000 J/cm, while the measured values for the other cooling modes are shown in FIG. 4 for the heat input of 65,000 J/cm. In FIG. 4, the blanked marks represent the measured values at the intermediate portion of the test piece and the black marks represent the values measured at the outer surface of the test piece. It is seen from FIG. 4 that a rate of cooling almost three times faster than that with conventional welding may be obtained with the inventive welding with one nozzle. With increase in the number of the nozzles and hence in the flow rate of cooling water, a faster rate of cooling may be obtained and, with forced circulation of cooling water with three nozzles (flow rate: 45 lit./min.), the mean cooling rate may be elevated to 23° C./sec. As also seen from FIG. 4, the rate of cooling at the intermediate zone is faster than that at the upper surface of the test piece as a result of the reverse side cooling.

Figure 5:
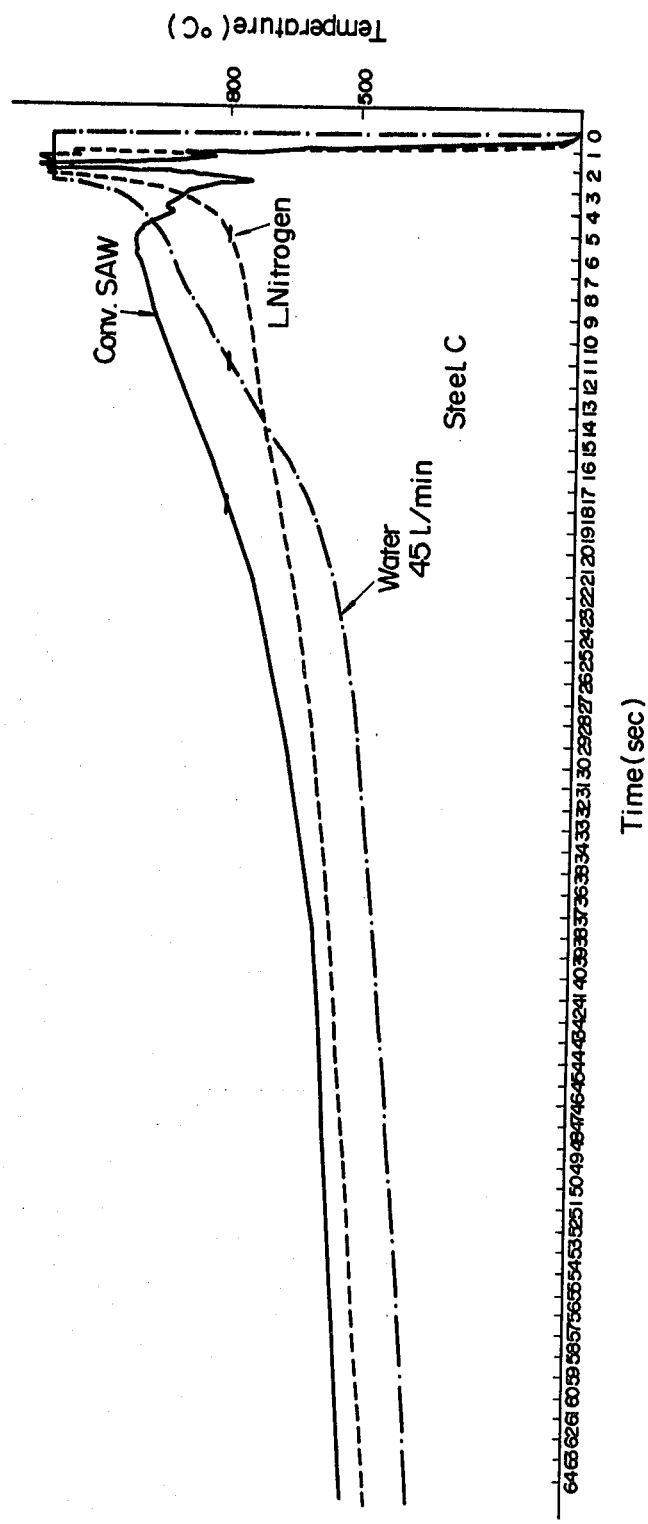
FIG. 5 shows typical cooling curves for steel test piece C by the conventional cooling and the inventive cooling.

FIG. 5 shows typical cooling curves for the test pieces C which are subjected to the conventional cooling with natural cooling and the inventive welding with reverse side cooling. As seen from FIG. 5, the maximum cooling capacity may be obtained with forced circulation of cooling water with three nozzles (flow rate, 45 liters per minute).

Figure 6:
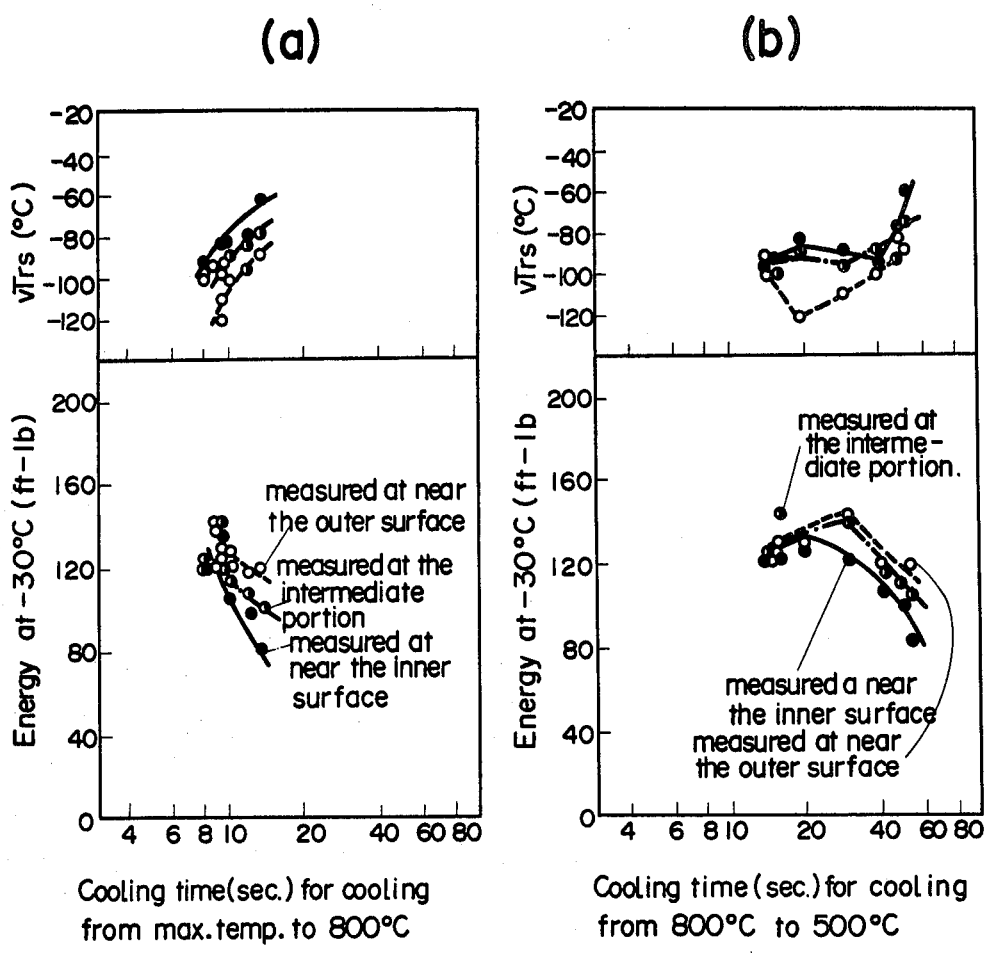
FIG. 6(a) is a cooling time versus toughness diagram chart for the steel test piece A cooled by reverse side cooling through the range of the maximum temperature to 800° C.
FIG. 6(b) is a similar chart but for the temperature range of from 800° to 500° C.

The test steel piece A was subjected to a submerged arc welding pass on the inside under the conditions shown in Table 4 and then to a submerged arc welding on the outside while the inside of the pipe was cooled with water, nitrogen and dry ice according to the above-mentioned six cooling modes. FIGS. 6(a) and 6(b) show the measured values of the weld toughness plotted against cooling time necessary for cooling from the maximum temperature to 800° C. and from 800° C. to 500° C., respectively. The toughness of the weld was masured at three places, namely close to the outer surface of the weld, the intermediate portion and at close to the inner surface of the weld. The same wires a for the leading and trailing wires and the flux Y were used for forming the inside and outside weld metals of the weld.

As seen from FIG. 6(a), the shorter cooling time for the specified temperature range is effective to improve the toughness of the weld metal. As also seen from FIG. 6(b), the shorter cooling time for the specified temperature range imparts higher toughness to the weld metal. The weld metal of the test piece A has presumably elevated hardenability and a substantially constant value of vE-30° C.=127 to 136 ft-lb may be obtained at a mean cooling rate of 15° C. per second (cooling time interval, 20 seconds) for the temperature range of 800° C. to 500° C.

Figure 7:
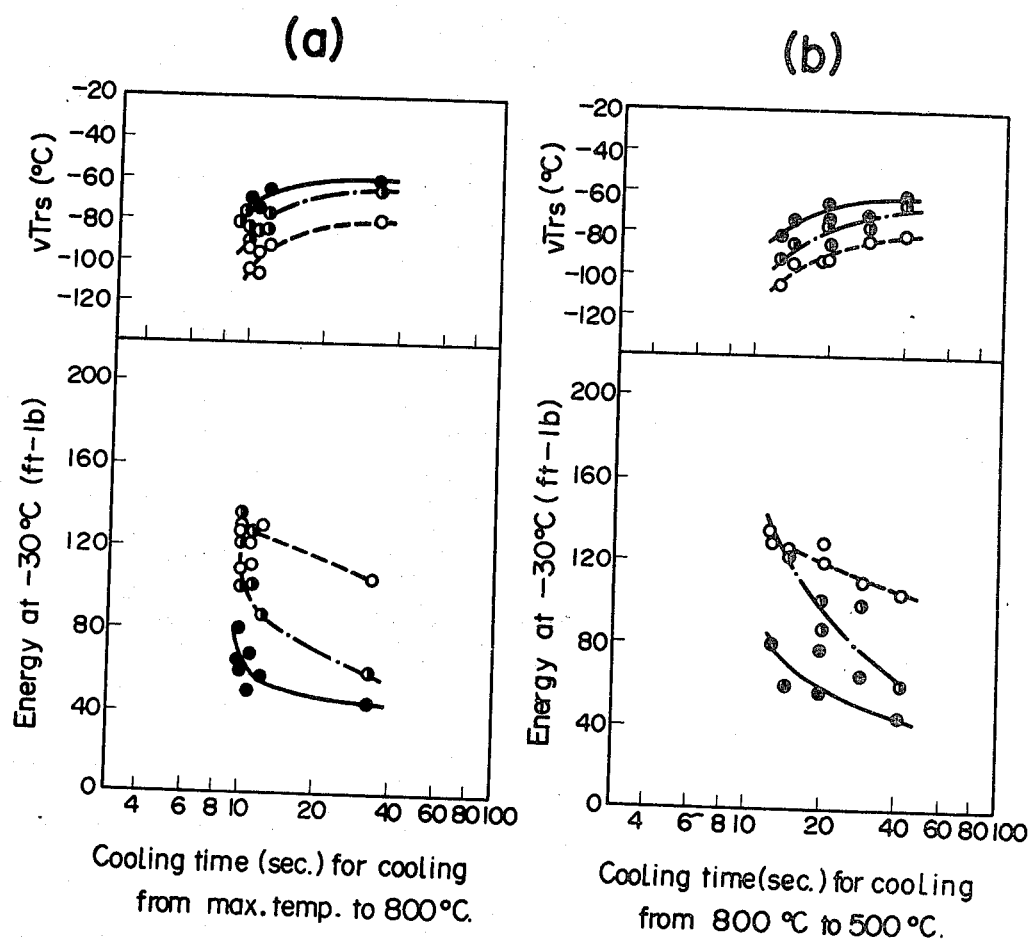
FIGS. 7(a) and 7(b) are the similar diagram charts to FIGS. 6(a) and 6(b) for the steel test piece B.

The test steel piece B was also subjected to a submerged arc welding pass under the conditions shown in Table 4. The pipe thus formed was then seam welded at the outside by submerged arc welding while the inside weld was cooled in the abovementioned manner. FIGS. 7(a) and 7(b) show the measured values of toughness of the weld metal against the cooling time intervals necessary for cooling through the specified ranges of temperature.

In FIGS. 7(a) and 7(b), the wires a and b and the flux Y were used for the inside welding and the same wires a with the flux Y were used for the outside welding. The weld toughness was measured at three positions, namely close to the outer surface of the weld, at the intermediate portion and close to the inner surface of the weld.

As seen from FIG. 7(a) and 7(b), the shorter the cooling time intervals for the specified ranges of temperature, the higher the toughness of the weld metal. Especially, the cooling time for the temperature range from 800° C. to 500° C. shown in FIG. 7(b) decidedly affects the toughness of the weld metal. In the present case, the compensating wires (leading wire a and trailing wire b) were used for inside welding to reduce the quenching effect that might be exerted on the inside weld at the time of the outside welding. When the test piece B manufactured by controlled rolling is subjected to the conventional welding, the inside weld will be lowered in toughness compared to outside weld or the transition zone between the outside and inside welds because of precipitation hardening caused by the precipitation of Nb and V from the parent metal and of Ti from the welding wires. In the case of the inventive welding with reverse side cooling, there is not sufficient time and temperature for these elements to precipitate and hence the zone of precipitation brittleness can be minimized.

Thus, with the welding method of this invention, the need for using compensating wires may be eliminated because of the suppression of the precipitation hardening of the weld metal applied in the preceding pass. The toughness of the weld metal may be further improved by using the wires with high hardenability such as wires a for the leading and trailing wires.

In FIGS. 7(a) and 7(b), the wires a and b and the flux Y were used for the inside weld, while the wires a and the flux Y were used for the outside weld.

Figure 8:
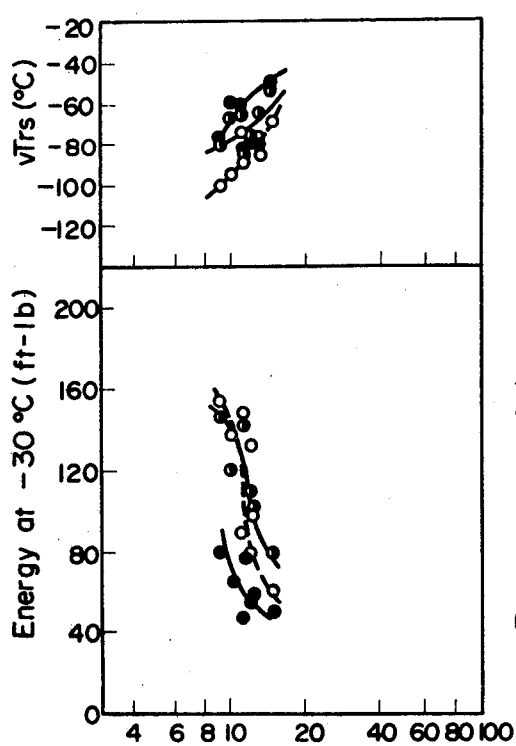
FIGS. 8(a) and 8(b) are the similar diagram charts to FIGS. 6(a) and 6(b) for the steel test piece C.
Figure 8:
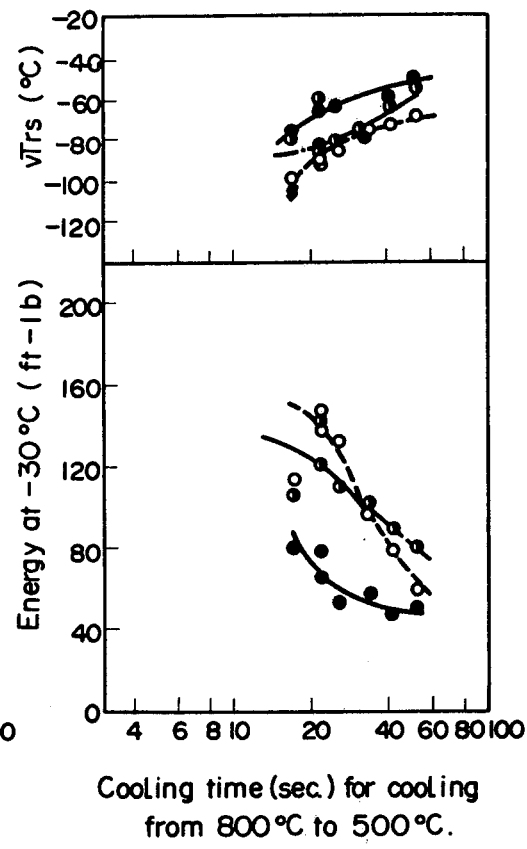
Figure 9:
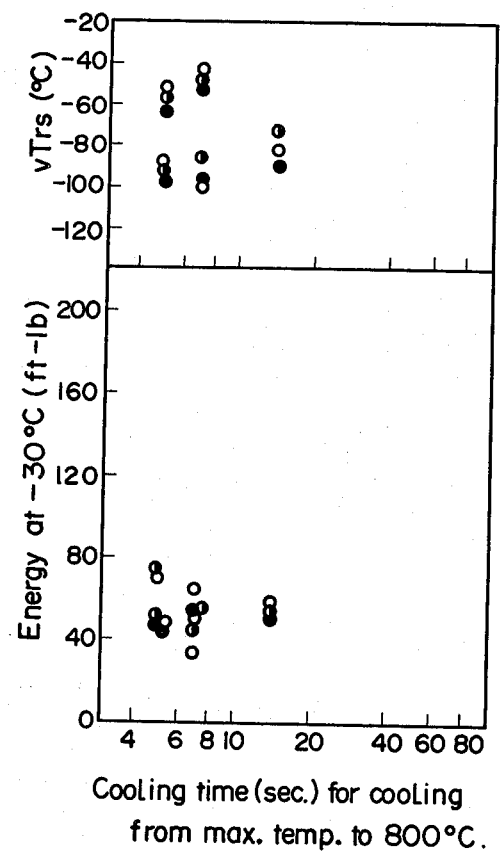
FIGS. 9(a) and 9(b) are the similar diagram charts to FIGS. 6(a) and 6(b) for the steel test piece D.
Figure 9:
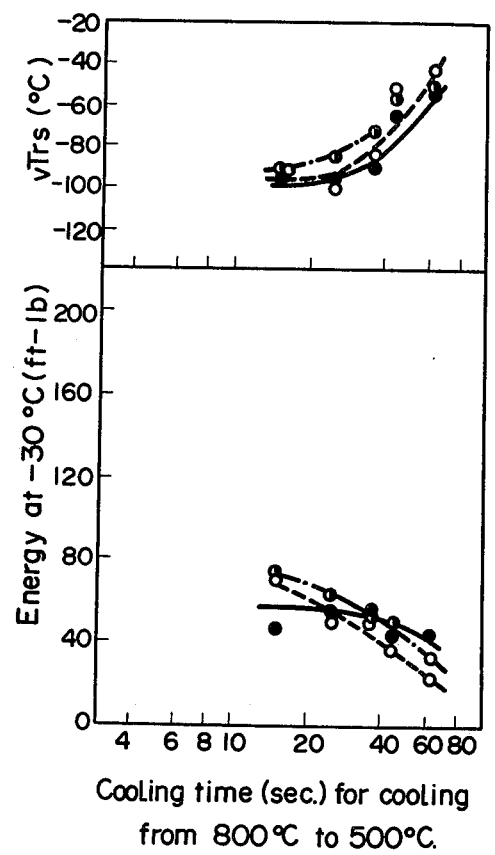

The results of similar tests conducted for the steel plate C are shown in FIGS. 8(a) and 8(b). As seen from these Figures, the test results for the steel piece C are substantially the same as those for the steel pieces A and B.

In FIGS. 6 to 9 inclusive, the blanked circles represent the data as measured towards the outer surface, whereas the semi-blanked circles and the black circles represent the test data as measured with the thermocouples at the intermediate zones and towards the inner surface, respectively.

When a thin steel piece of a lower grade is formed into a pipe by SAW with use of a conventional wire a, it may frequently occur that the weld metal obtained has not sufficient toughness. For this reason, it was proposed in the past to use a Ni-Mo-B wire and a flux added with MnO and $ZrO_2$ such as flux X shown in Table 3. FIGS. 9(a) and 9(b) show the toughness against cooling time of the weld joint obtained by using the low-grade thin-walled test steel piece D and a combination of the conventional fluxes and wires.

The steel piece D was formed into shape by submerged arc welding on the inside by using the same wires a for the leading and trailing wires and the flux X. The tube thus formed was then subjected to the submerged arc welding on the outside by using the same wires a+a and the flux Y while cooling the inside of the tube simultaneously. The toughness of the weld metal was measured near the outer and inner surfaces and at the intermediate portion with respect to the cooling time for the two ranges of cooling temperature. While no fixed relation may be observed to exist in FIG. 9(a) between the toughness of the weld metal and the cooling time above 800° C., it may be apparent from FIG. 9(b) that the shorter cooling time for the range of 800° C. to 500° C. is highly effective to improve the toughness of the weld. It may be seen from FIG. 9(b) that the toughness may be improved by about twice in terms of vE-30° C. and by about 40° C. in terms of vTrs as compared with the case of using spontaneous cooling.

Figure 10:
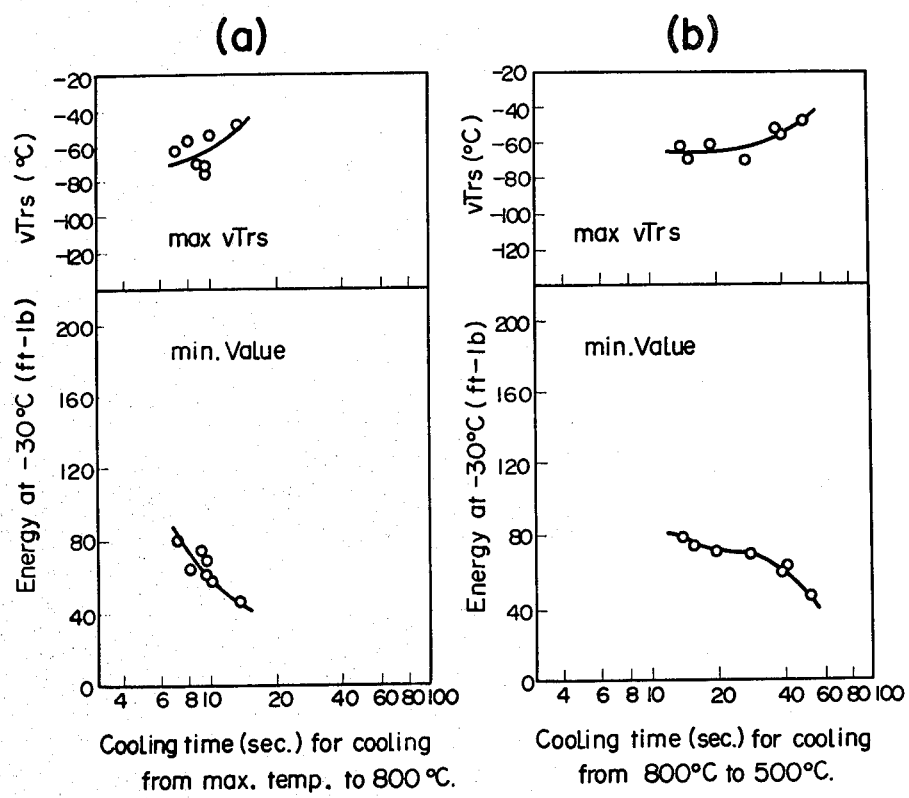
FIGS. 10(a) is a cooling time versus toughness diagram chart for HAZ of the steel test piece A for the temperature range from maximum temperature to 800° C.
FIG. 10(b) is a similar diagram chart but for the temperature range from 800° to 500° C.

In FIGS. 10(a) and 10(b), the toughness of HAZ of a steel A pipe obtained by submerged arc welding under the welding conditions shown in Table 4 is plotted against cooling time. It may be seen from these Figures that the HAZ toughness may be improved with shorter cooling time for the both temperature ranges and, in the case of reverse side cooling from 800° C. to 500° C. within 14 seconds, the toughness may be improved by about twice in terms of vE-30° C. and by about 15° C. in terms of vTrs as compared with the case of spontaneous cooling. It is believed that promoted cooling through the temperature above 800° C. results in reduced sizes of preaustenitic crystal grains and prevention of the enfeebled γ grain boundary. It is also presumed that promoted cooling through 800° C. to 500° C. favors the formation of a highly tenacious lower bainite while preventing the formation of the upper bainite which may be detrimental from the viewpoint of toughness.

Figure 11:
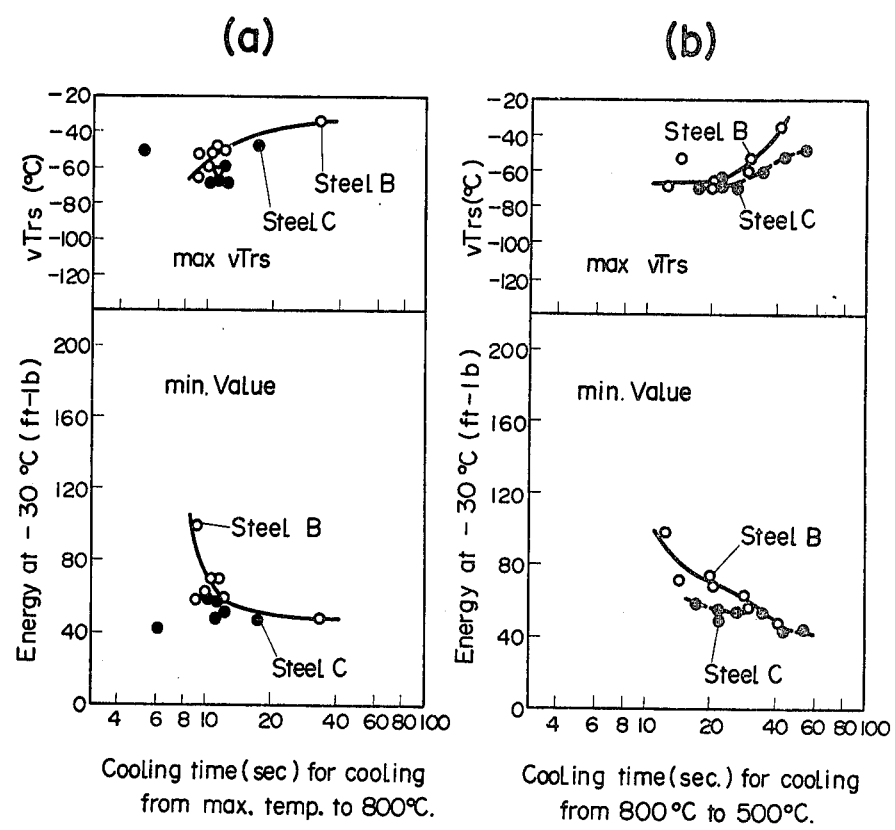
FIGS. 11(a) and 11(b) are the diagram charts for the steel test pieces B and C similar to FIGS. 10(a) and 10(b)
Figure 12:
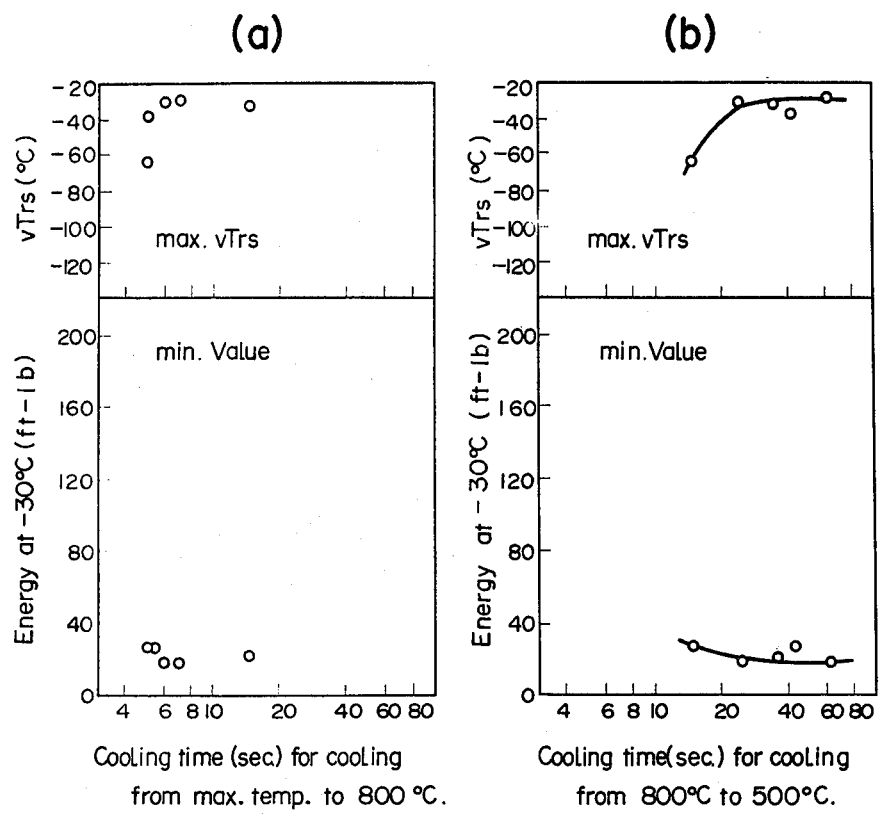
FIGS. 12(a) and 12(b) are the diagram charts for the steel test piece D similar to those shown in FIGS. 10(a) and 10(b)

FIGS. 11(a) and 11(b) show similar results obtained with steel types B and C. With the type B, with faster cooling rates through the both temperature ranges, the HAZ will become increasingly tough. Above all, the cooling time through the range of 800° C. to 500° C. decidedly affects the toughness of HAZ. When the HAZ has been cooled in 12.5 seconds through said temperature range, the measured values of toughness may be improved by about 1.8 times in terms of vE-30° C. and by about 33° C. in terms of vTrs as compared with the case of spontaneous cooling. With type C, the cooling time through 800° C. to 500° C. decidedly affects the toughness of the resulting HAZ. For example, when the latter has been cooled in 17 seconds through said range, the values of toughness may be improved by about 1.5 times in terms of vE-30° C. and by about 38° C. in terms of vTrs as compared with the case of spontaneous cooling. the similar results may be observed in FIGS. 12(a) and 12(b) for the steel type D. While there is observed no fixed relation between the toughness and cooling time for the temperature range above 800° C., it may be seen from FIG. 11(b) that shorter cooling time required for cooling through 800° C. to 500° C. results in a markedly improved toughness in terms of vTrs.

Figure 13:
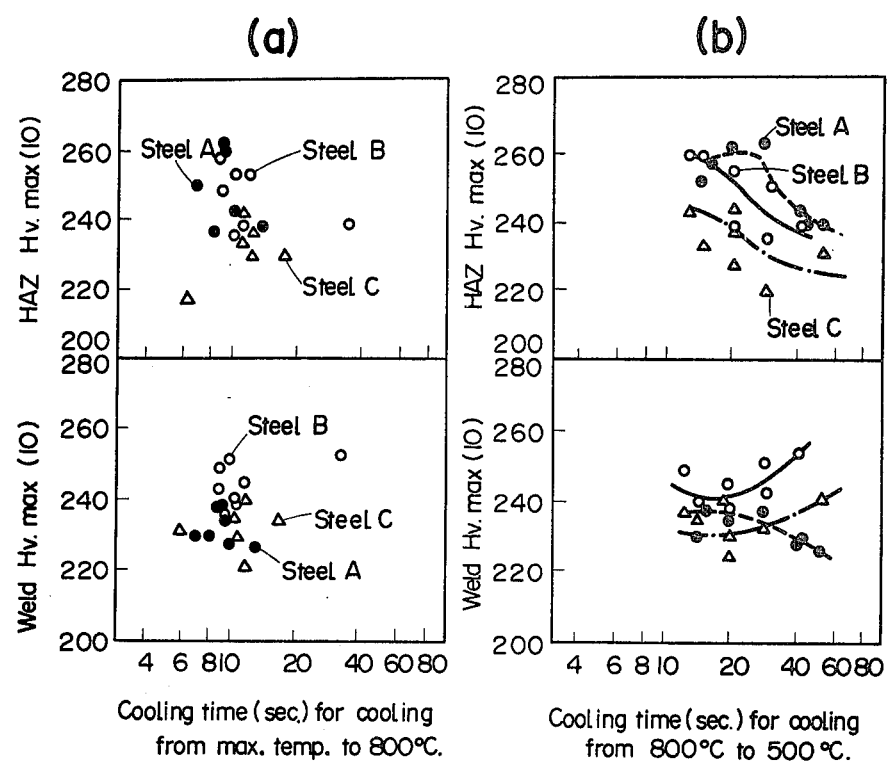
FIG. 13(a) is a cooling time versus hardness diagram chart for HAZ and weld metals of the steel test pieces A, B and C and for the temperature range from maximum temperature to 800° C.
FIG. 13(b) is a similar diagram chart but for the temperature range from 800° to 500° C.

FIGS. 13(a) and 13(b) show the effects of the inventive reverse side cooling on the maximum hardness of the weld metal and HAZ of test pipes formed of the steel pieces A, B and C. The test pipes were prepared by welding along a longitudinal joint line on the inside and then welding along the same joint line on the outside with simultaneous forced cooling from the side of the inner weld, as described in the foregoing. With these steel types, there is again no definite relation between the hardness and the cooling time through the temperature range above 800° C. However, as shown in FIG. 13(b), with shorter cooling time for the temperature range through 800° C. to 500° C., the hardness of the weld zone may be increased progressively until substantially constant values of Hv. max. 238 for weld metal and Hv. max. 260 for HAZ are attained for the steel types A and B. With the steel types B and C, as the cooling rate increases for the range of 800° C. to 500° C., the maximum hardness of the weld metal tends to increase at the outset and then starts to decrease at a slow rate while HAZ tends to increase gradually. With steel type B, the hardness of HAZ reaches the Hv. max. 258 at the mean cooling rate of 24° C. per second for the range of 800° C. to 500° C. The carbon equivalent Ceq of the steel type C is 0.368 which is lower than that of steel type B (0.385), and thus the hardenability of the steel C is lower than that of the steel B. This accounts for a somewhat lower value of the maximum hardness of the HAZ and weld metal of the steel type C than that of the steel type B.

Figure 14:
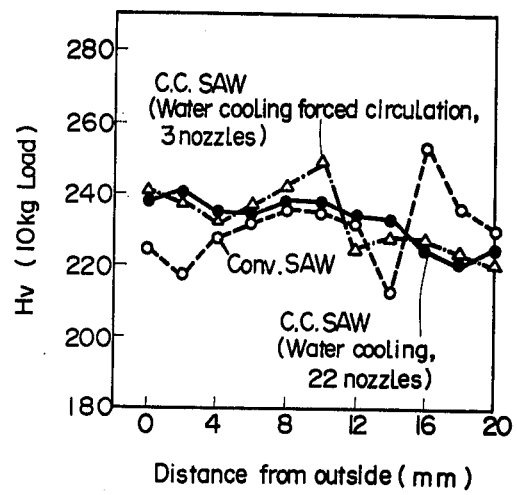
FIG. 14 is a diagram chart showing the distribution of hardness through the inside and outside weld metals for the steel test piece B.
Figure 15:
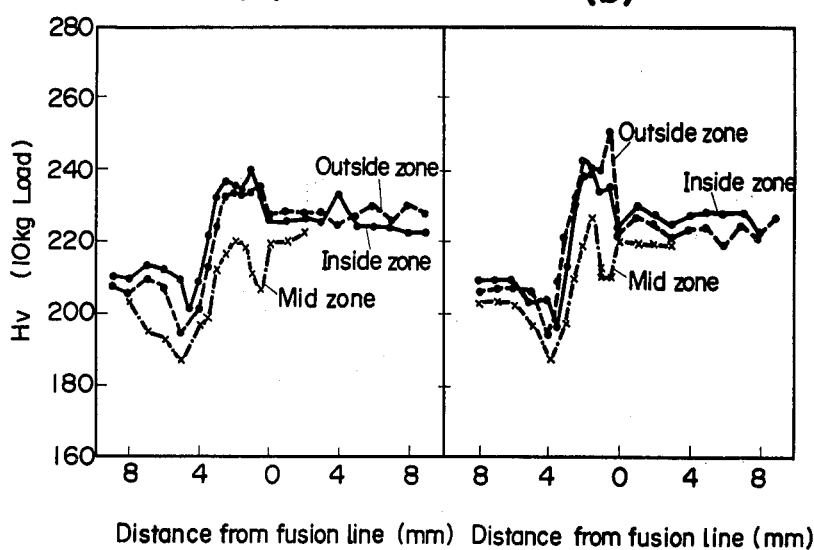
FIG. 15(a) is diagram chart showing the distribution of hardness through the inside and outside weld metals for the steel test piece B in the case of conventional welding with spontaneous cooling.
FIG. 15(b) is a similar chart to FIG. 15(a) but in the case of 3 nozzle water cooling with forced circulation.

With the steel types B and C obtained by controlled rolling, the weld metal will be lowered in hardness with shorter reverse side cooling time for the temperature range from 800° C. to 500° C., as discussed in the foregoing. FIG. 14 shows the hardness distribution in the direction of plate thickness of the inside and outside weld metals for the steel type B weld joint. In general, with the conventional S A W followed by spontaneous cooling, designated as Conv. SAW in the drawing, the inner and outer surfaces and the portions adjacent thereto are softened by heating to approximately the fusing points and the elements such as Nb, Ti and V are turned into solid solution. On the other hand, the intermediate portion of the weld metal spaced about 2 mm from the inner and outer surfaces are heated to a range from 60020 C. to Ac point and hardened by precipitation of Ni, V and Ti in the form of carbides and nitrides. However, when the steel pipe welded on the outside is welded on the inside with simultaneous reverse side cooling designated as C. C. SAW in the drawing, the range of temperature and time necessary for precipitation of these elements will be limited thus the precipitation hardening may be suppressed with consequently lowered hardness in the inner zone. On the other hand, with increase in the rate of reverse side cooling, the outside weld is hardened, because the same wires a are used for the outside welding. Therefore, with the weld joint obtained by the inventive welding, the region of maximum hardness will be shifted from the comparable region of the weld obtained the conventional welding which is not accompanied by reverse side cooling. The HAZ hardness is increased with an elevated rate of reverse side cooling for the respective steel types as discussed in the foregoing, with the region of maximum hardness being situated at a mid zone which is spaced 0.5 to 1 mm apart from the fusion line, as indicated in FIGS. 15(a) and 15(b). It is the cooling time for the range of 800° C. to 500° C., rather than that for the range above 800° C., that affects markedly on the hardening of the weld. It is believed that the cooling time for the temperature range above 800° C. affects the grain sizes of the austenite crystal grains, whereas the cooling time for the range between 800° C. and 500° C. favors the precipitation of the lower bainite while suppressing the formation of the upper bainite.

Figure 16:
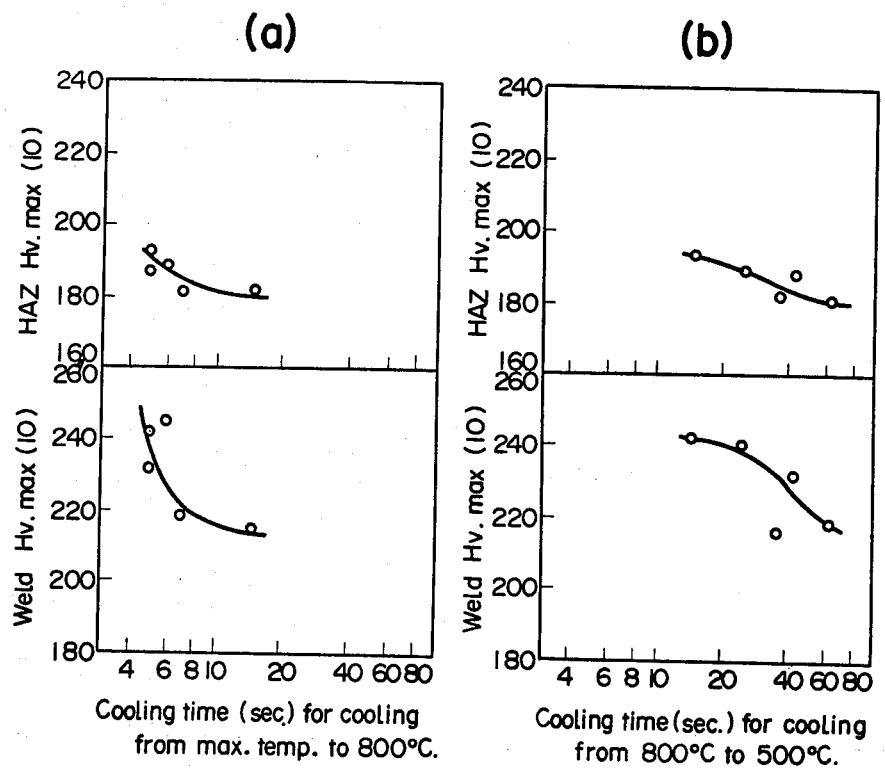
FIG. 16(a) is a cooling time versus hardness diagram chart in the case of the reverse side cooling for the HAZ and the weld metal for the temperature range from the maximum temperature to 800° C.
FIG. 16(b) is a similar chart to FIG. 16(a) but for the temperature range from 800° to 500° C.
Figure 17:
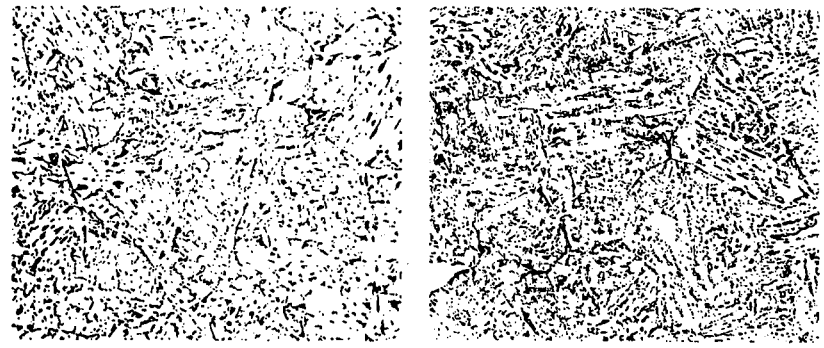
FIG. 17(a) is a photo showing the microstructure of the coarse grain zone of the HAZ of the test piece A obtained by conventional welding with spontaneous cooling.
FIG. 17(b) is a similar photo but showing the same portion of the test piece A obtained by the inventive welding with reverse side cooling.
Figure 18:
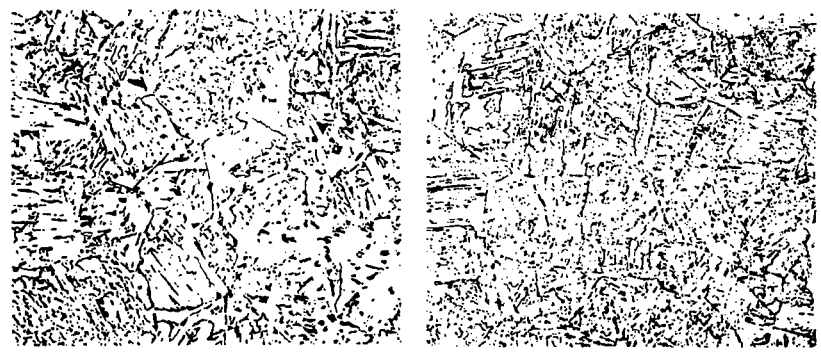
FIGS. 18(a) and 18(b) are the photos similar to FIGS. 17(a) and 17(b) but for the same portion of the test piece B.

In FIGS. 16(a) and 16(b), the test results on the effects of reverse side cooling on the hardness of the HAZ and weld metal for the low grade steel D are illustrated. It is seen from these Figures that the hardness of HAZ and weld metal is markedly affected by the cooling rates for the specified ranges of temperature and that the hardening may be more pronounced with faster rates of cooling. As shown in said Figures, with reverse side cooling in 15 seconds through the range of 800° C. to 500° C., the hardness of the weld metal amounts to Hv. max. 242, while that of HAZ equals to Hv. max. 193.

FIGS. 17(a), 17(b) and FIGS. 18(a), 18(b) show the photos (magnification ratio:400) of the microstructures of the HAZ for the steel types A and B, respectively, which are obtained by conventional welding and that obtained by the inventive welding with use of forced circulation with three nozzles. As seen from these Figures, the sizes of the preaustenite crystals of the coarsely grained HAZ have been reduced for both the types A and B as a result of the reverse side water cooling. It is also seen that the HAZ is made highly tough on account of the predominant formation of the upper bainite and the corrsponding suppression of the lower bainite.

Figure 19:
FIG. 19(a) is a photo showing the microstructure at the outer surface of the weld metal of the test piece B obtained by conventional welding.
FIG. 19(b) is a similar photo to FIG. 19(a) for the same test piece B but obtained by the inventive welding with reverse side cooling.

FIGS. 19(a), 19(b) are the photos taken by an electron microscope (magnification ratio:3000) showing the microstructures of the outside weld metals of a steel B tube obtained by conventional welding and a tube of the same steel type obtained by the inventive welding.

As seen from these Figures, by the reverse side cooling, the formation of coarse ferrites in the weld zone has been suppressed and a highly refined ferrite structure may be observed along with a small amount of bainite.

Figure 20:
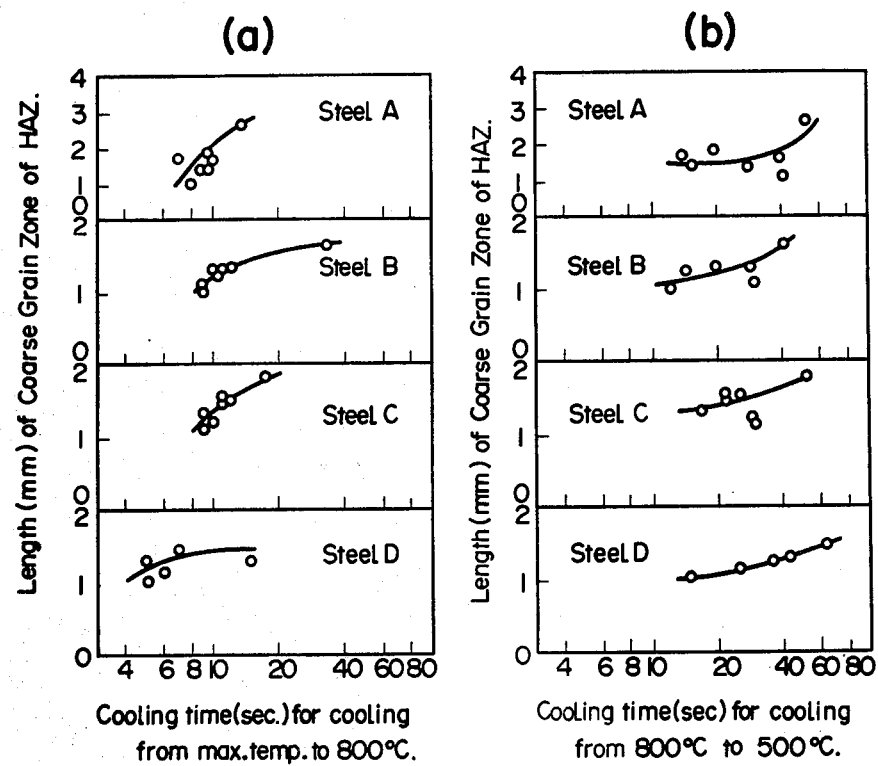
FIG. 20(a) is a diagram chart showing the cooling time from the maximum temperature to 800° C. plotted against length of the coarse grain zone of the HAZ for the test pieces A, B, C and D.
FIG. 20(b) is a similar chart to FIG. 20(a) but showing the cooling time from 800° to 500° C.

The width and size of the coarsely grained HAZ can be reduced by reverse side cooling. FIGS. 20(a), 20(b) show the widths and lengths of the coarse grain zone of the HAZ for the respective steel types for the various rates of reverse side cooling. As seen from these Figures, the widths and lengths of the coarse grain zone of HAZ for the respective steel types may be reduced by using shorter cooling rates for the temperature ranges above 800° C. and from 800° C. to 500° C. With use of liquid nitrogen and dry ice, a faster cooling rate may be attained for the temperature range above 800° C. on account of precooling effects and hence the sizes of the coarse grain zone may be reduced even if a slower cooling rate should be used for the temperature range between 800° C. and 500° C.

Thus, for elevating the toughness of HAZ, it is necessary to cool promptly through the abovementioned two temperature ranges. Prompt cooling through the range above 800° C. is effective to reduce the width of the coarse grain zone and to prevent the preaustenite crystal grains from becoming coarse. On the other hand, prompt cooling through the range of from 800° C. to 500° C. is effective to prevent the precipitation of the upper bainite and to favor the formation of the lower bainite. The above applies to the weld metal as well. Thus, prompt cooling through the two temperature ranges is effective to make the ferrite ground of the molten metal more refined and to facilitate the formation of the lower bainite with resulting increase in the toughness of the weld metal.

Figure 21:
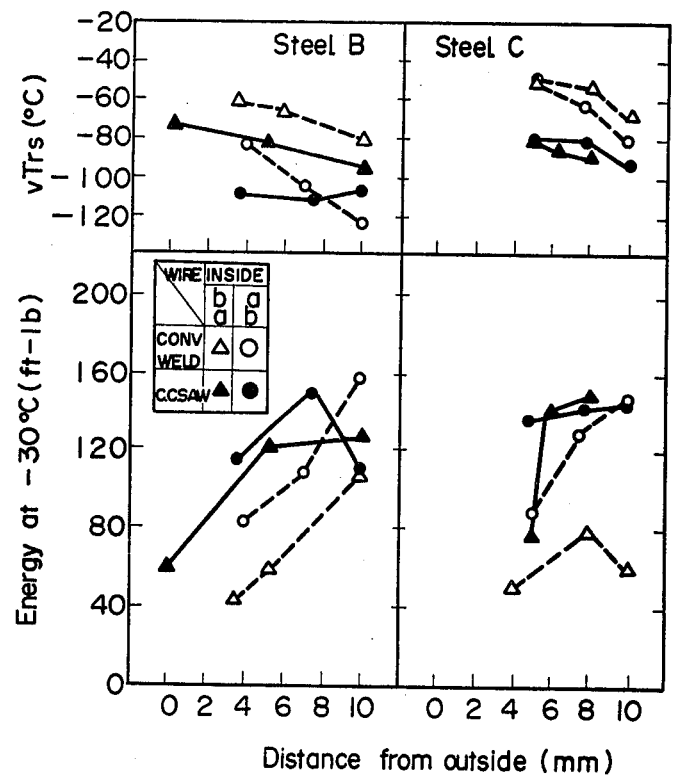
FIG. 21 is a diagram chart showing the toughness distribution of the inside weld in the direction of the weld thickness with use of different and same welding wires for the inside weld.
Figure 22:
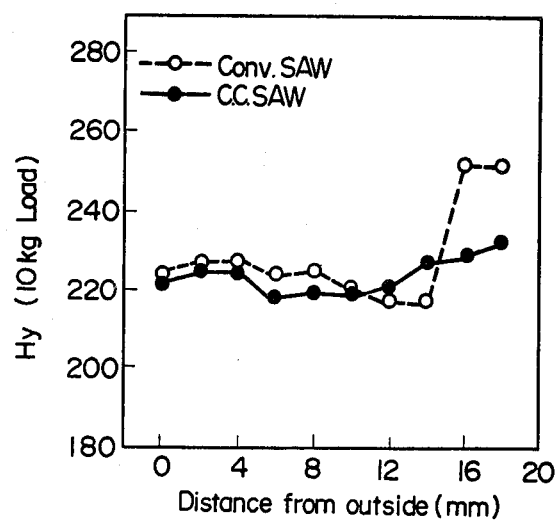
FIG. 22 is a diagram chart showing the hardness distribution through the inside and outside weld metals in the direction of thickness for the test piece C obtained by conventional SAW with use of same inside wires and the same test piece obtained by inventive SAW with use of same inside wires.

In case the parent metal is prepared by controlled rolling, the inside weld of a pipe which has been welded previously on the outside is known to become extremely brittle by precipitation hardening when allowed to cool. So far, the compensating wires were used for welding the inside of a steel pipe welded previously on the outside. In case of steel pipe that is welded at the inside and outside by using an arc welding accompanied by reverse side cooling, the inside weld tends to be lowered in hardness as compared with the outside weld. In order to make the hardness and toughness of the weld more uniform, tests have been conducted by using the same wire a and different wires a, b for the leading and trailing wires. The test results are shown in FIGS. 21 and 22. In FIG. 21, the toughness of the weld is plotted against the distance from outside for the cases in which the steel pipes (types B and C) were subjected to the two side welding followed by spontaneous cooling (Conv. Weld) and to the inventive welding (C. C. SAW) with use of two nozzles (flow rate, 24 liters per minute). As seen from FIG. 21, with use of the leading wire b and triling wire a, the inside surface zone of the weld metal obtained by the inventive welding is less tenacious than the intermediate and outside surface zones, whereas the intermediate zone of the weld metal obtained by the inventive welding with use of the same wire a for both the leading and trailing wires is almost as tenacious as the remaining zone. FIG. 22 shows the hardness of the weld plotted against distance from outside surface of the weld, with the partition line between the outside and inside weld being disposed at about 13 mm from the ourside surface. The test piece was steel C and the dotted and solid lines represent the curves obtained with conventional welding and with the inventive welding with two nozzles, respectively. It may be presumed that the inside weld obtained by using the compensating wires (wires a and b) is lowered in hardness because its hardening process is affected adversely by the reverse side cooling and also the precipitation hardening is prevented thereby from occurring. As seen from FIG. 22, with use of the same wires a for both the leading and trailing wires, uniform distribution of hardness may be attained in the direction of the plate thickness. It is believed that precipitation hardening in the vicinity of the inside surface of the weld is suppressed by reverse side cooling while the inside surface is slightly hardened by the cooling thus imparting sufficient toughness to the zone close to the inside surface. Thus, with the inventive welding with reverse side cooling, if the same wires a are used for the leading and trailing wires on the occasion of the inside welding, the weld metal may be made uniformly tough along its thickness. In this way, uniform hardness may also be attained along the plate thickness because of suppression of the precipitation hardening which might otherwise occur at near the inside surface.

In the foregoing, the inside weld is formed previously on a tube and the outside of the tube is welded simultaneously with cooling at the inside. It is however possible to weld at the outside of the pipe and then to weld at the inside thereof with cooling simultaneously at the outside. Also, when the inside and outside welding is performed in plural passes, the reverse side cooling may be performed in the last pass. Namely, one side welding is effected on a leading or forward pass and reverse side welding with concurent cooling is effected in a trailing or reverse pass.

Although the present invention has been described for the case of submerged arc welding with two electrodes, it can be applied to the case of gas shield welding. A single electrode or three or more electrodes may also be employed. However, since the submerged arc welding is usually associated with the lower rate of cooling, and the use of plural electrodes is usually associated with higher heat input, the present invention may be applied advantageously to the case of one-pass submerged arc welding of a large-diameter thick-walled steel tubing on the inside and outside with use of two or more electrodes.

What is claimed is:

1. A method of arc welding a steel pipe formed by a steel plate bent into pipe shape with abutting ends, said method comprising welding a seam at the abutting ends by conveying the pipe through leading and trailing passes and forming bead layers on opposite sides of a weld zone during respective passes, and effecting the formation of the bead layer of the weld zone during the trailing pass with a heat input of more than 36,000J/cm while effecting forced cooling of the weld zone from the reverse side simultaneously, the forced cooling being effected to cool the weld from the weld temperature to 800° C. within 11 seconds and from 800° C. to 500° C. at a cooling rate of 8–40° C. per second.

2. A method as claimed in claim 1 wherein the bead layer of the weld zone in the forward welding pass is effected by submerged arc welding using front and rear Ni-Mo-Ti electrode wires.

3. The method as claimed in claim 1 wherein the forced cooling is performed at a rate of 15 to 30° C. per second until the temperature of the weld is cooled from 800° C. to 500° C.

4. The method as claimed in claim 1 wherein water is used as cooling medium.

5. The method as claimed in claim 1 wherein liquid nitrogen is used as cooling medium.

6. The method as claimed in claim 1 wherein the dry ice is used as cooling medium.

* * * * *